United States Patent
Roberts

(10) Patent No.: US 8,103,715 B1
(45) Date of Patent: Jan. 24, 2012

(54) APPROACH FOR MANAGING MOBILE AGENTS IN NETWORKS

(75) Inventor: Kenneth John Roberts, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 2091 days.

(21) Appl. No.: 10/170,323

(22) Filed: Jun. 11, 2002

(51) Int. Cl.
*G06F 15/16* (2006.01)
*G06F 15/173* (2006.01)
*G06F 17/30* (2006.01)

(52) U.S. Cl. ............................ 709/202; 709/223; 726/27

(58) Field of Classification Search .......... 709/227–228, 709/201–203, 223–225; 718/100; 714/4, 714/4.1; 726/3–4, 26, 27
See application file for complete search history.

(56) References Cited

U.S. PATENT DOCUMENTS

| | | | | |
|---|---|---|---|---|
| 5,634,010 A * | 5/1997 | Ciscon et al. | ................... | 709/223 |
| 5,784,566 A * | 7/1998 | Viavant et al. | ................ | 709/229 |
| 6,012,090 A * | 1/2000 | Chung et al. | ................... | 709/219 |
| 6,021,438 A * | 2/2000 | Duvvoori et al. | ............. | 709/224 |
| 6,134,580 A * | 10/2000 | Tahara et al. | .................. | 709/202 |
| 6,148,327 A * | 11/2000 | Whitebread et al. | .......... | 709/202 |
| 6,192,391 B1 * | 2/2001 | Ohtani | ........................... | 709/201 |
| 6,253,256 B1 * | 6/2001 | Wollrath et al. | .............. | 719/330 |
| 6,430,698 B1 | 8/2002 | Khalil et al. | | |
| 6,442,586 B1 | 8/2002 | Glass | | |
| 6,447,563 B1 * | 9/2002 | Mahulikar | ....................... | 51/309 |
| 6,539,416 B1 * | 3/2003 | Takewaki et al. | ............. | 709/202 |
| 6,675,212 B1 * | 1/2004 | Greenwood | .................... | 709/224 |
| 6,678,828 B1 * | 1/2004 | Pham et al. | ........................ | 726/2 |
| 6,769,121 B1 * | 7/2004 | Koyama et al. | ............... | 718/100 |
| 6,886,024 B1 * | 4/2005 | Fujita et al. | .................... | 709/201 |
| 6,915,129 B1 * | 7/2005 | Kovacs | ....................... | 455/432.3 |
| 6,915,326 B2 * | 7/2005 | Hattori et al. | .................. | 709/202 |
| 6,931,550 B2 * | 8/2005 | Rygaard | ........................... | 726/23 |
| 6,973,651 B1 * | 12/2005 | Ching et al. | ................... | 718/100 |
| 2002/0188724 A1 * | 12/2002 | Scott | .............................. | 709/225 |
| 2004/0006588 A1 * | 1/2004 | Jessen | ............................ | 709/202 |

OTHER PUBLICATIONS

Baumann, J. (1997), A Protocol for Orphan Detection and Termination in Mobile Agent Systems, Technical Report Sep. 1997, Faculty of Computer Science, University of Stuttgart, Stuttgart, Germany. [retrieved from the Internet "ftp://ftp.informatik.uni-stuttgart.de/pub/library/ncstrl.ustuttgart_fi/TR-1997-1997/TR-1997-1997.pdf" on Jul. 7, 2009].*

Vijay Varadharajan, "Security enhanced mobile agents"; Proceeding CCS '00 Proceedings of the 7th ACM conference on Computer and communications security ACM New York, NY, USA ©2000 [retrieved from ACM databse on Feb. 26, 2010].*

* cited by examiner

*Primary Examiner* — Philip Chea
*Assistant Examiner* — Lashanya Nash
(74) *Attorney, Agent, or Firm* — Hickman Palermo Truong & Becker LLP

(57) ABSTRACT

An approach for managing mobile agents in a network generally involves configuring a mobile agent in a secure manner such that the mobile agent will automatically terminate itself if the mobile agent cannot communicate with a specified entity before moving or the mobile agent cannot successfully communicate with a specified entity within a specified period of time. According to another embodiment, if a management process cannot communicate with a mobile agent within a specified period of time, then the management process attempts to cause the termination of the mobile agent. The management process may contact another management process that has the ability to terminate the mobile agent and request that other management process to cause the termination of the mobile agent. According to another embodiment, the management process may cause the creation and dispatch of a "hunter-killer" mobile agent configured to locate and cause the termination of other mobile agents.

12 Claims, 6 Drawing Sheets

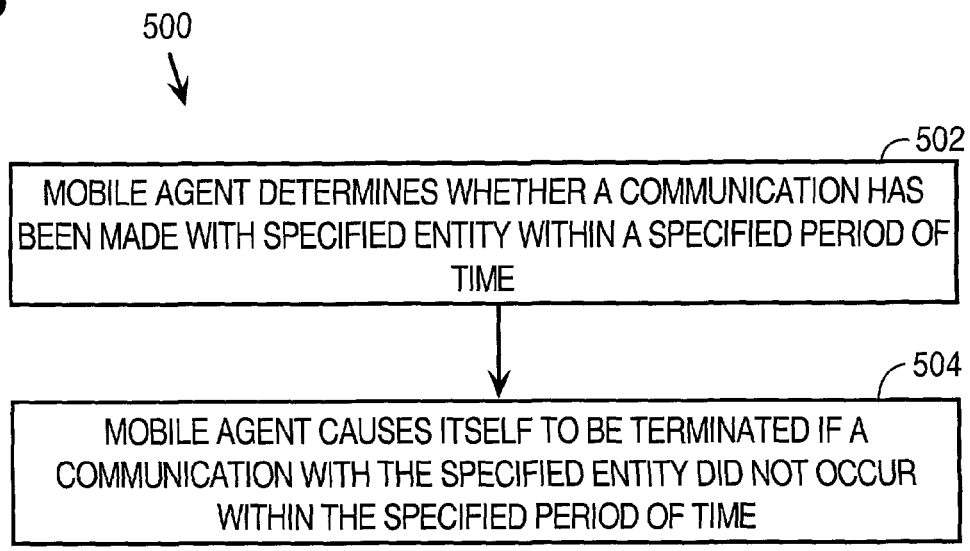
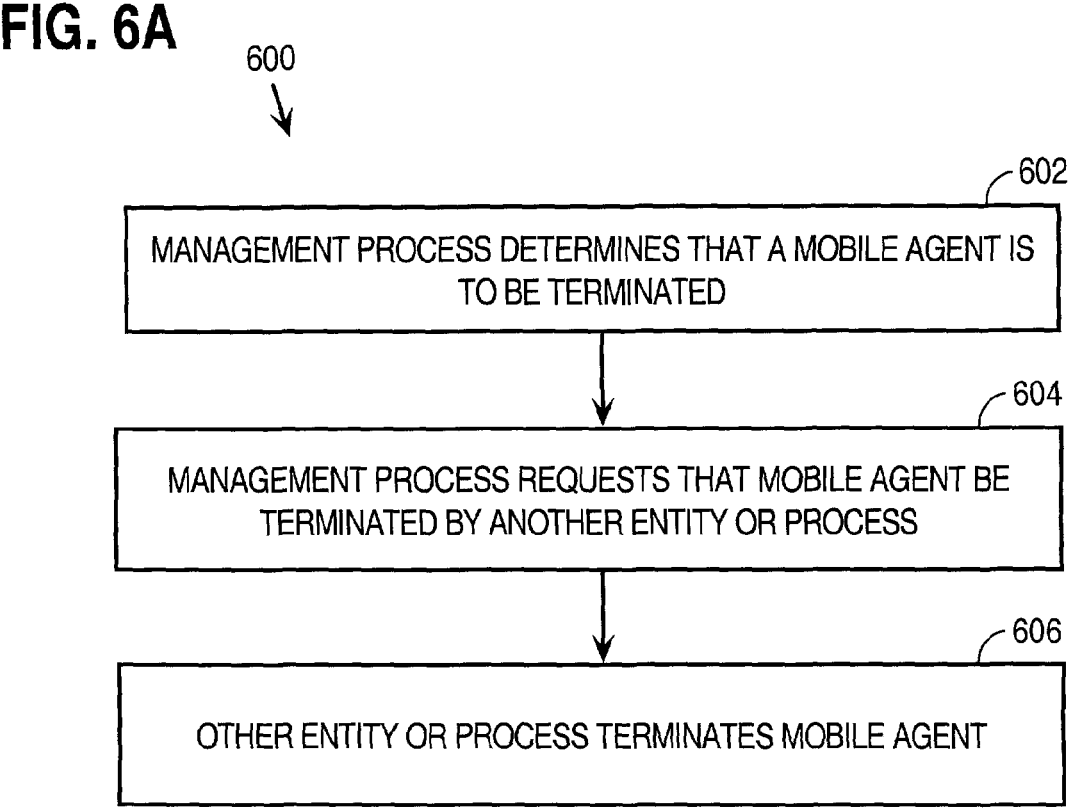

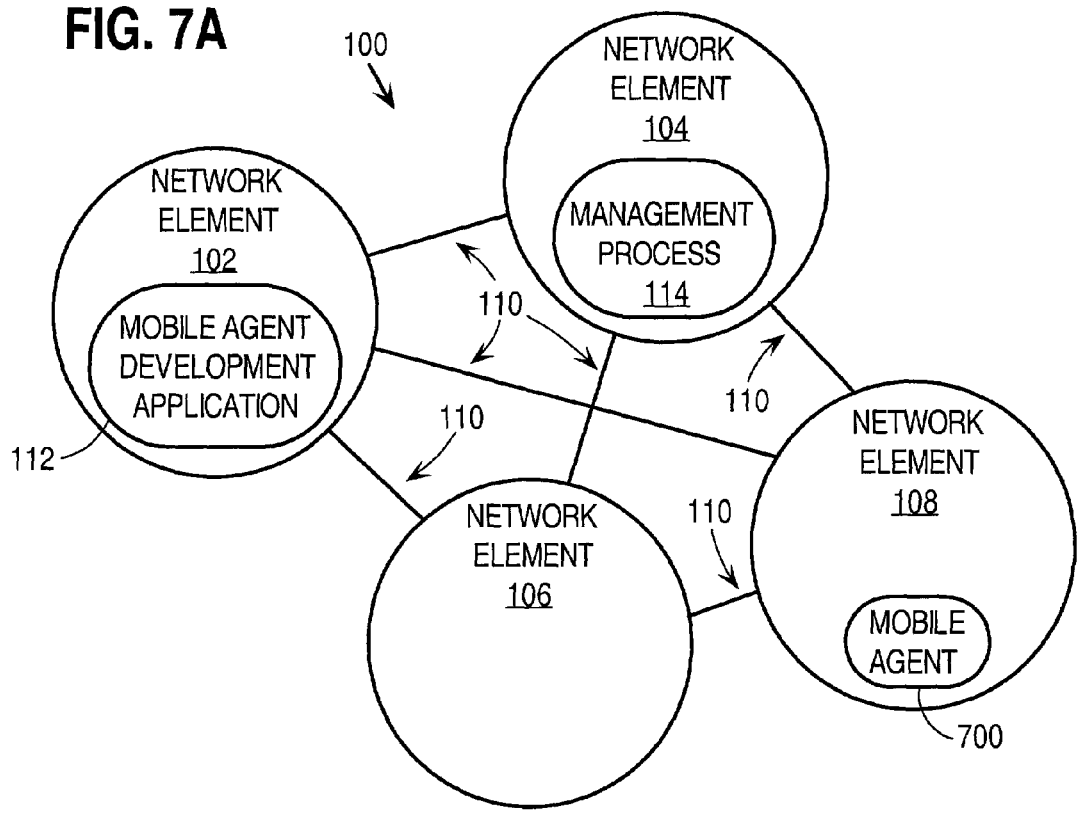
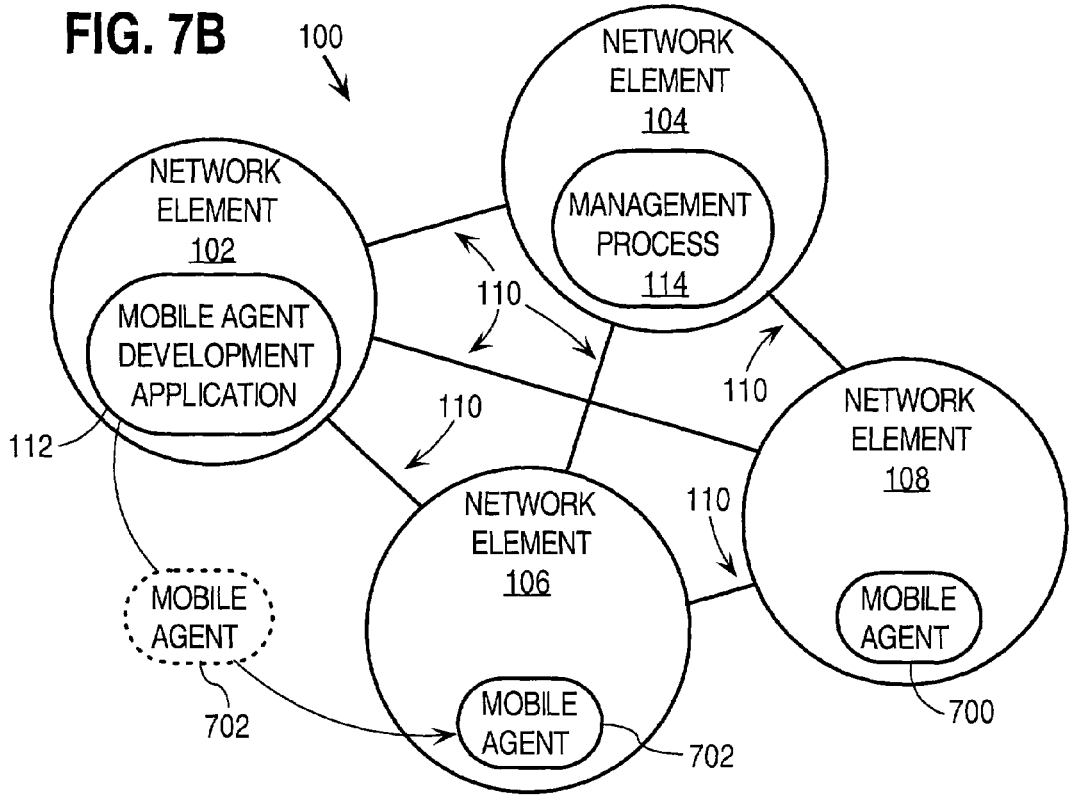

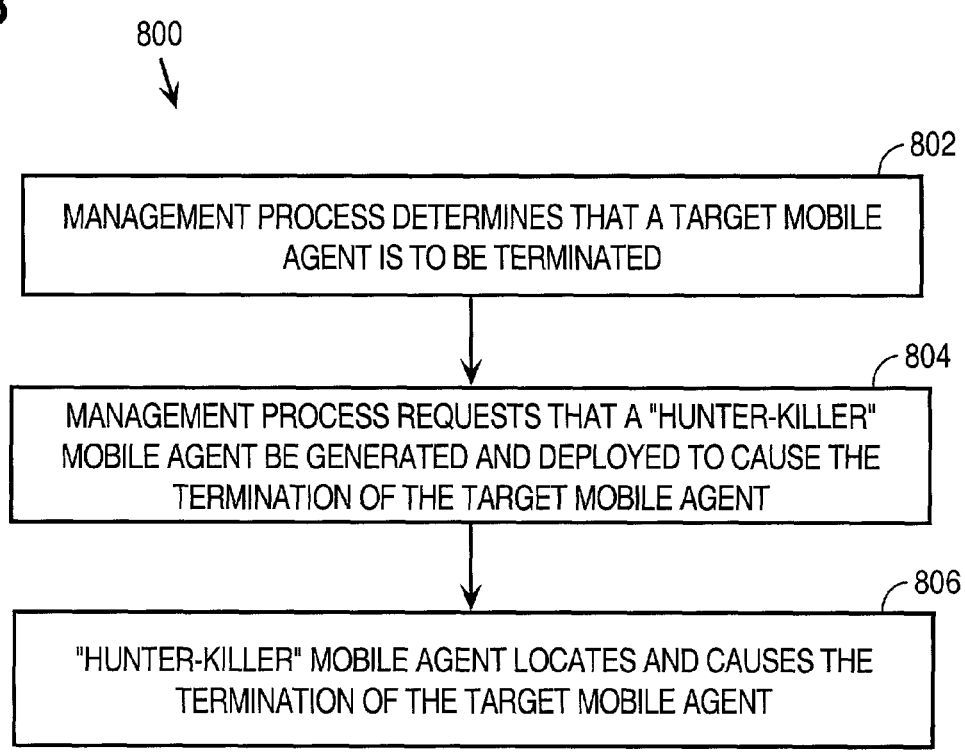

APPROACH FOR MANAGING MOBILE AGENTS IN NETWORKS

FIELD OF THE INVENTION

This invention relates generally to managing processes in networks, and more specifically, to an approach for managing mobile agents in networks.

BACKGROUND OF THE INVENTION

The approaches described in this section are approaches that could be pursued, but not necessarily approaches that have been previously conceived or pursued. Therefore, unless otherwise indicated, the approaches described in this section are not prior art to the claims in this application and are not admitted to be prior art by inclusion in this section.

Static agents are self-contained units of processing that are configured to perform one or more functions. Static agents are used to perform a wide variety of tasks, such as data translation, data processing and data management. In the context of a network, static agents are often installed on most, if not all, network elements in the network. This approach makes the static agents ready to process data as necessary. One of the primary disadvantages of static agents, however, is that they always consume at least some resources, e.g., storage resources, even if they are not actively processing data.

More recently, mobile agents have been used to address the limitations of static agents. Like their static agent counterparts, mobile agents are self-contained units of processing. Unlike static agents, however, mobile agents have the ability to traverse a network, performing work at multiple network elements. A mobile agent moves from a first network element to a second network element by replicating itself on the second network element and then causing the deletion of the original instantiation of the mobile agent on the first network element. Thus, a single mobile agent may perform tasks on a large number of network elements.

One of the primary benefits of mobile agents compared to static agents is that they generally consume relatively fewer resources. For example, a mobile agent may be assigned to perform a task on a first network element. After performing the task on the first network element, the mobile element moves to a second network element. Once the mobile agent has moved from the first network element to the second network element, the mobile agent no longer consumes any resources on the first network element. Thus, mobile agents only consume resources when they reside at a particular network element and are therefore very flexible and useful tools for performing work in networks.

Despite the benefits provided by mobile agents, they do have some drawbacks. One of the most important concerns is the possible adverse effects caused by a mobile agent that ceases to operate in a deterministic manner. Much like a classic computer virus, a mobile agent operating in a non-deterministic manner has the capability to replicate itself and move unimpeded throughout a network. At a minimum, this could have the unintended results of overloading a network or worse, causing the destruction of valuable data.

Based upon the foregoing, there is a need for an approach for managing mobile agents in networks that does not suffer from the limitations in prior approaches. There is a particular need for an approach for managing mobile agents in networks that reduces the risks associated with mobile agents that may begin operating in a non-deterministic manner.

SUMMARY OF THE INVENTION

According to one aspect of the invention, an approach is provided for managing a process in a network. The approach includes sending, to a recipient process, a communication relating to the process moving from a first network element in the network to a second network element in the network. If a response to the communication is received, then the process is moved from the first network element in the network to the second network element in the network. If a response to the communication is not received, then the process is terminated.

According to another aspect of the invention, an approach is provided for managing a process that is configured to move between network elements in a network. A communications message is sent to a recipient process. If a response to the communications message is not received within a specified period of time, then the process causes the process to be terminated.

According to another aspect of the invention, an approach is provided for managing a process that is configured to move between network elements in a network. According to the approach, if the process determines that one or more instructions in the process have been modified, then the process causing the process to be terminated. A variety of techniques may be used to make the determination that one or more instructions in the process have been modified. For example, a checksum value or signature may be determined and then checked.

According to another aspect of the invention, a computer-readable medium is provided carrying one or more sequences of instructions which, when executed by one or more processors, cause the one or more processors to generate a mobile agent. The mobile agent is configured to deter nine whether one or more instructions in the mobile agent have been modified, and if one or more instructions in the mobile agent have been modified, then cause the mobile agent to be terminated.

According to another aspect of the invention, a computer-readable medium is provided carrying one or more sequences of instructions which, when executed by one or more processors, cause the one or more processors to generate a mobile agent. The mobile agent is configured to send, to a recipient process, a communication relating to the mobile agent moving from a first network element in the network to a second network element in the network. If a response to the communication is received, then the mobile agent moves from the first network element in the network to the second network element in the network. If a response to the communication is not received, then the mobile agent is terminated.

According to another aspect of the invention, an approach is provided for managing a process in a network. According to the approach, if the process has moved from a first network element in the network to a second network element in the network without a communication relating to the move being received, then the process is terminated.

According to another aspect of the invention, an approach is provided for managing a mobile agent in a network. According to the approach, if a communication has not been received from the mobile agent within a specified period of time, then the mobile agent is terminated.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5 is a flow diagram that depicts an approach for a mobile agent to cause itself to be terminated based upon the mobile agent not communicating with a specified entity within a specified period of time.

FIG. 6A is a flow diagram that depicts an approach for a management process to request that another entity or process terminate a mobile agent.

FIG. 7A is a block diagram that depicts a target mobile agent deployed in a network arrangement.

FIG. 7B is a block diagram that depicts a "hunter-killer" agent deployed in the network arrangement of FIG. 7A.

FIG. 8 is a flow diagram that depicts an approach for causing the termination of a mobile agent using a "hunter-killer" mobile agent.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. CREATING AND DEPLOYING MOBILE AGENTS
III. MOBILE AGENT DESIGN AND ARCHITECTURE
IV. MOBILE AGENT TERMINATION BY MOBILE AGENTS
V. MOBILE AGENT TERMINATION BY MANAGEMENT PROCESSES
VI. IMPLEMENTATION MECHANISMS

I. Overview

An approach for managing mobile agents in a network generally involves configuring a mobile agent in a secure manner such that the mobile agent will automatically terminate itself if the mobile agent cannot communicate with a specified entity before moving to another network element or the mobile agent cannot successfully communicate with a specified entity within a specified period of time. According to another embodiment, if a management process cannot communicate with a mobile agent within a specified period of time, then the management process attempts to cause the termination of the mobile agent. The management process may contact and request that another entity terminate the mobile agent. According to another embodiment, the management process causes the creation and deployment of a "hunter-killer" mobile agent that is configured to locate and cause the termination of the mobile agent.

The approaches described herein for managing mobile agents in networks provide for the termination of mobile agents under certain conditions without placing an undue processing burden on either mobile agents or management processes. Thus, the benefits of using mobile agents are realized while reducing the risks associated with mobile agents that may operate in a non-deterministic manner.

II. Creating and Deploying Mobile Agents

Figure 1:
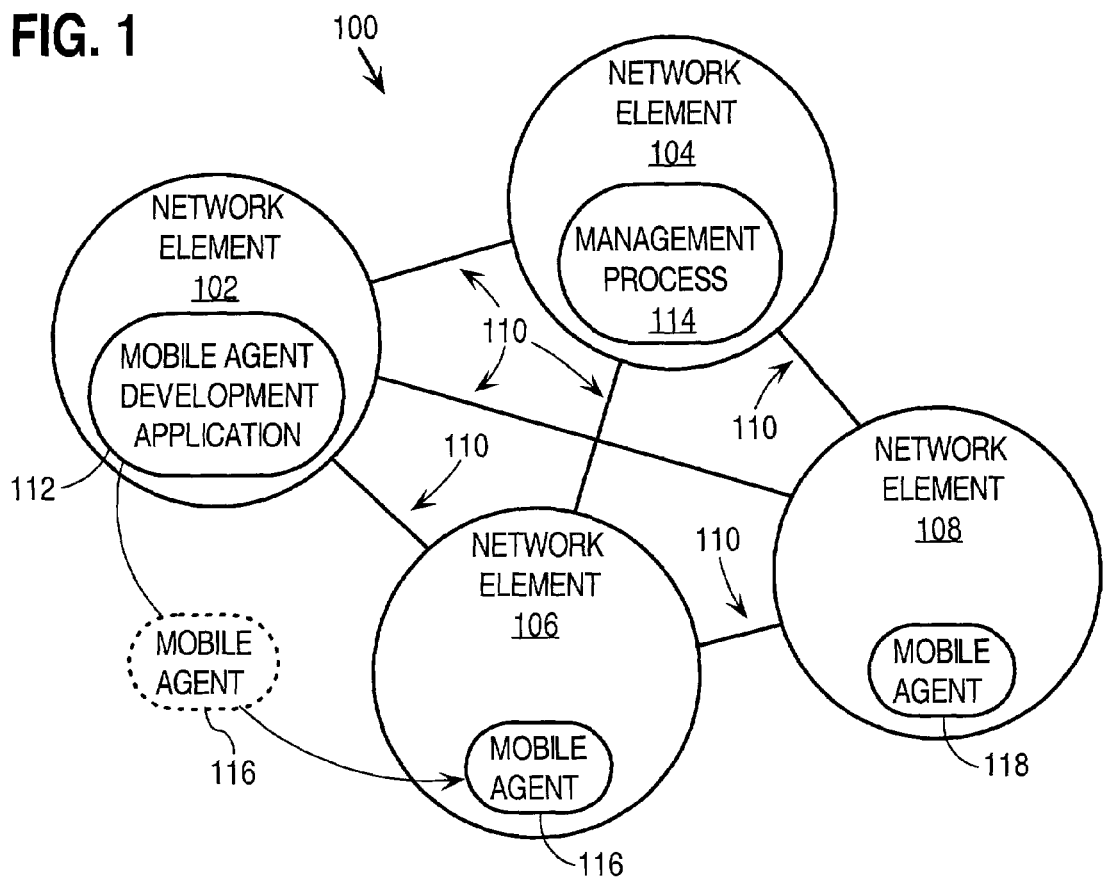
FIG. 1 is a block diagram that depicts an network arrangement upon which embodiments may be implemented.

FIG. 1 is a block diagram that depicts a network arrangement 100 upon which embodiments may be implemented. Network arrangement 100 includes network elements 102, 104, 106, 108 that are communicatively coupled via a set of links 110. Network elements 102, 104, 106, 108 may be any type of network elements depending upon the requirements of a particular application and the invention is not limited to any particular type of network elements. Examples of network elements 102, 104, 106, 108 include, without limitation, hubs, routers and switches. Network elements 102, 104, 106, 108 may be configured to support the execution of any number of processes. Furthermore, network elements 102, 104, 106, 108 may be co-located on a single computing node, or disposed in a distributed computing arrangement, and the invention is not limited to any particular implementation.

Links 110 may be implemented by any medium or mechanism that provides for the exchange of data between network elements 102, 104, 106, 108. Examples of links 110 include, without limitation, a network such as a Local Area Network (LAN), Wide Area Network (WAN), Ethernet or the Internet, or one or more terrestrial, satellite or wireless links. For purposes of brevity, links 110 are depicted in FIG. 1 as direct connections between network elements 102, 104, 106, 108. Links 110 do not have to be direct physical connections, however, and may involve connections through any number of network elements, for example network switches, hubs and routers that are not depicted in FIG. 1. Furthermore, links 110 may include software links, e.g., routine calls.

A mobile agent development application 112 is disposed on network element 102. Mobile agent development application 112 is a mechanism that is configured to provide for the creation of mobile agents. Mobile agent development application 112 may be implemented in computer hardware, computer software, or any combination of computer hardware and software, depending upon the requirements of a particular application, and the invention is not limited to any particular implementation.

Mobile agent development application 112 may be configured to create mobile agents in several ways, depending upon the requirements of a particular application. For example, mobile agent development application 112 may be configured with a Graphical User Interface (GUI) to allow administrative personnel to directly interact with mobile agent development application and request the creation of mobile agents. Mobile agent development application 112 may also be configured with an Application Program Interface (API) to allow other applications to communicate with mobile agent development application 112 and request the creation of mobile agents.

As depicted in FIG. 1, a management process 114 is disposed on network element 104 and requests that mobile agent development application 112 create a mobile agent. For purposes of explanation, management process 114 is disposed on a separate network element from mobile agent development application 112. This is not a requirement, however, and management process 114 may be co-located on the same network element with mobile agent development application 112.

In the present example, mobile agent development application 112 creates a mobile agent 116 having the particular attributes specified by management process 114. Mobile agent 116 is then deployed onto network arrangement 100. Mobile agents may be deployed in several ways and the invention is not limited to any particular approach. For example, as depicted in FIG. 1, management process 114 may request that mobile agent development application 112 deploy mobile agent 116 to network element 106. Alternatively, management process 114 may itself deploy mobile agent 116 onto network arrangement 100. Once deployed to network element 106, mobile agent 116 begins executing and performing its prescribed tasks.

III. Mobile Agent Design and Architecture

Mobile agents may be implemented in a variety of ways, depending upon the requirements of a particular application. Typically, mobile agents are embodied in one or more sequences of instructions (mobile agent code) that execute on one or more processors. An example implementation of mobile agent code is a Java Applet. Mobile agent code typically includes instructions for replicating the mobile agent code to another location and then causing the execution of the new copy of the mobile agent code. Mobile agent code may also include instructions for deleting the original mobile agent code, thus completing a move of the mobile agent code.

Figure 2:
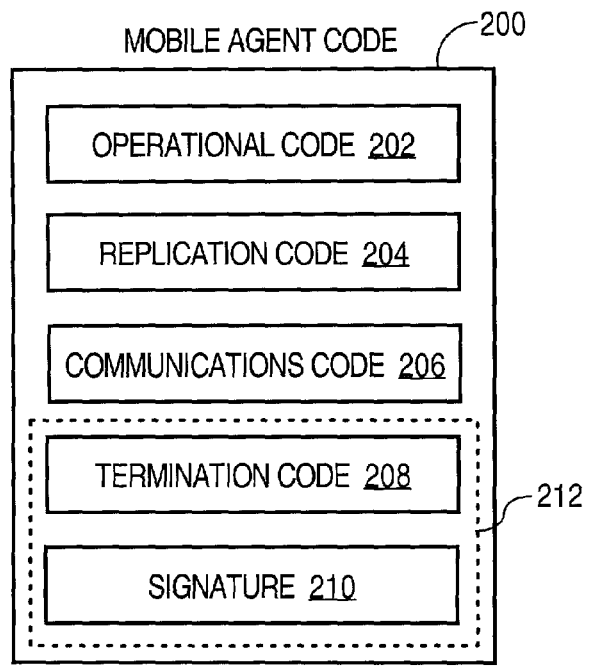
FIG. 2 is a block diagram that depicts example mobile agent code.

FIG. 2 is a block diagram that depicts example mobile agent code 200 generated by mobile agent development application 112 according to an embodiment. Mobile agent code 200 includes operational code 202, replication code 204, communications code 206, termination code 208 and a signature 210.

Operational code 202 includes instructions for performing the particular functions for which the mobile agent was developed. These may be any type of functions depending upon the requirements of a particular application and the invention is not limited to any particular set of instructions. For example, the operational code 202 may include instructions for processing data and determining when the processing of data has been completed.

Replication code 204 includes instructions for replicating mobile agent code 200 on another location and causing the execution of the replicated mobile agent code 200. For example, as depicted in FIG. 1, the replication code 204 for mobile agent 216 may include instructions for causing a copy of mobile agent code 200 to be created on network element 108, thus creating a new mobile agent 118, that is a copy of mobile agent 116. Replication code 204 may also include instructions for deleting the original mobile agent code to complete a move of a mobile agent. For example, the replication code 204 for mobile agent 216 may include instructions for causing the deletion of the original mobile agent code 200 for mobile agent 216 from network element 106, leaving only mobile agent 218 on network element 108.

Communications code 206 includes instructions that allow mobile agents to communicate with other entities, such as other processes or hardware elements, such as network elements.

Termination code 208 includes instructions for a mobile agent to cause itself to be terminated under certain circumstances. The termination of mobile agents is described in more detail hereinafter.

Signature 210 is data that may be used to uniquely identify a mobile agent. Signature 210 may also be used for a variety of purposes, including authenticating communications between mobile agents and other entities. Examples of signature 210 include, without limitation, identification data, codes, encryption keys, random numbers, patterns, and other data.

According to one embodiment, mobile agent development application 112 is configured to create mobile agent code 200 in a manner so that the mobile agent code 200 is secure from being altered. In particular, mobile agent code 200 is generated in a manner such that termination code 208 and signature 210 are protected code 212. Being protected code 212, termination code 208 and signature 210 may not be altered, by a mobile agent itself, mobile agent development application 112, or any other entity. This ensures that the approaches described herein for terminating mobile agents will be implemented at the appropriate time.

Any approach may be used to establish protected code 212, depending upon the requirements of a particular application, and the invention is not limited to any particular approach. For example, a checksum value may be determined based upon protected code 212 and then used to determine whether protected code 212 has been altered. As another example, signature 210 may be a unique value determined based upon the contents of protected code 212 or mobile agent code 200 and then used to determine whether protected code 212 has been altered. As yet another example, protected code 212 may be "seeded" with a known pattern or signature that is used to determine whether protected code 212 has been altered. As another example, a "population count" of the superclass methods may be used as either a raw authentication value, or as a seed for an authentication algorithm.

IV. Mobile Agent Termination by Mobile Agents

According to one embodiment, mobile agents are configured to cause their own termination if specified criteria are satisfied. The particular criteria used may vary from mobile agent to mobile agent and from implementation to implementation. According to one embodiment, the specified criteria include whether a mobile agent is able to successfully communicate with a specified entity before moving to another location, e.g., another network element. Example entities include, without limitation, network elements and processes, such as a management process. If the mobile agent is not able to communicate with the specified entity, then the mobile agent causes its own termination. There are numerous reasons why a communication with a specified entity is not successful. Examples include, without limitation, failure of a communications link, failure of the specified recipient, lack of a response from the specified recipient and an unexpected response from the specified entity.

Figure 3:
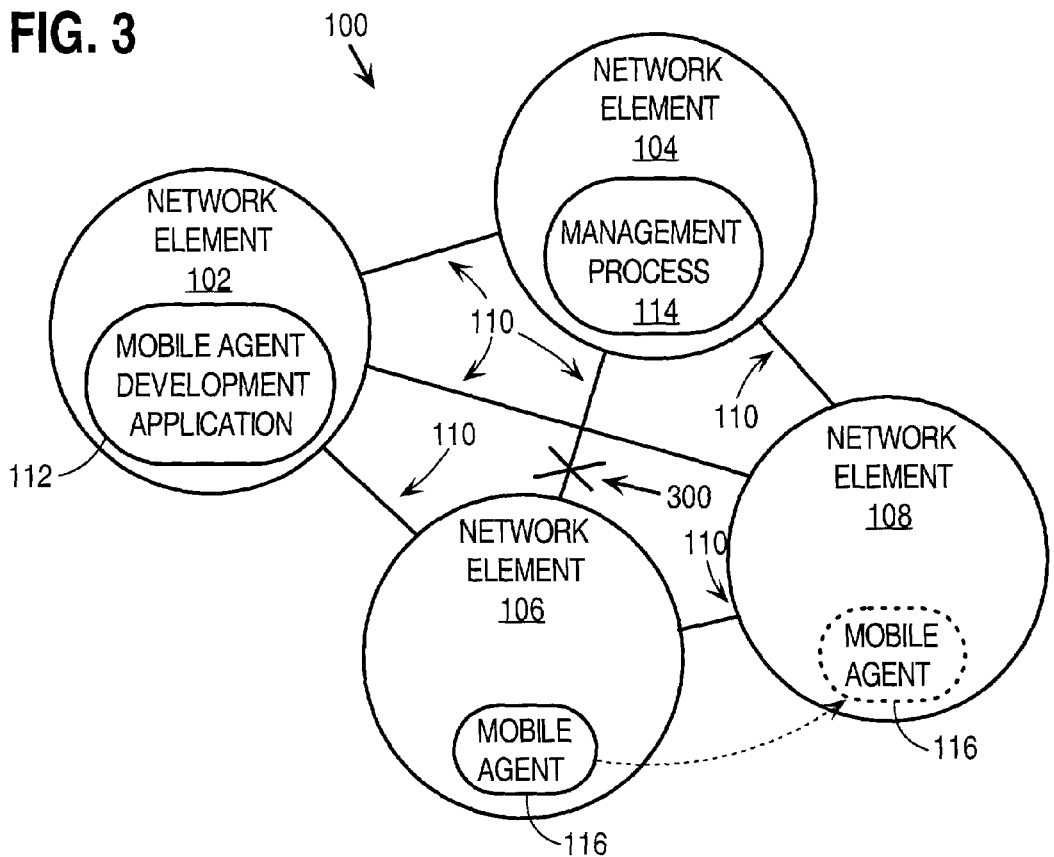
FIG. 3 is a block diagram that depicts the network arrangement of FIG. 1 with a communications link failure that prevents a mobile agent from communicating with a management process.

FIG. 3 is a block diagram that depicts the network arrangement 100 of FIG. 1 with a communications link failure 300 that prevents a mobile agent from communicating with a specified entity. In FIG. 3, mobile agent 116 is disposed on, e.g., executes on, network element 106. Mobile agent 116 has determined that it desires to move to network element 108. For example, mobile agent 116 may have determined, in accordance with its own internal algorithm, that its work on network element 106 is complete and that it should move to network element 108.

Before moving to network element 108, mobile agent 116 attempts to communicate over links 110 with management process 114. The type of communication made by a mobile agent may vary depending upon the requirements of a particular application and the invention is not limited to any particular type of communication. For example, mobile agent 116 may attempt to notify management process 114 that it is preparing to move to another network element. This notification may also specify the particular destination, e.g., network element 108. As another example, the notification may include a request for authorization to perform a move.

The determination that a communication is unsuccessful may be performed many ways and the invention is not limited to any particular approach for determining that a communication is not successful. For example, mobile agent 116 may detect or be informed of an error while attempting to communicate with management process 114. This includes communications errors, e.g., a failure of links 110, as well as a failure of management process 114. As another example, mobile agent 116 may not receive an expected response from management process 114. In this situation, a timeout mechanism may be employed to aid in making the determination that an expected response has not been received. The type of response expected may vary depending upon the requirements of a particular application an the invention is not limited to any particular type of response. For example, a response from management process 114 may include, a simple acknowledgment of the message sent by mobile agent 116. As another example, a response from management process 114 may include an authorization for a move to be made. Alternatively, the response from management process 114 may include other information and instructions for mobile agent 116. In FIG. 3, for purposes of explanation, it is presumed that link 110 between network element 106 and network element 104 has failed, preventing communications between mobile agent 116 and management process 114.

Once a mobile agent has determined that it cannot communicate with a designated entity, then the mobile agent causes itself to be terminated. In the present example, the execution of mobile agent 116 termination code 208 causes the deletion of mobile agent code 200.

Figure 4:
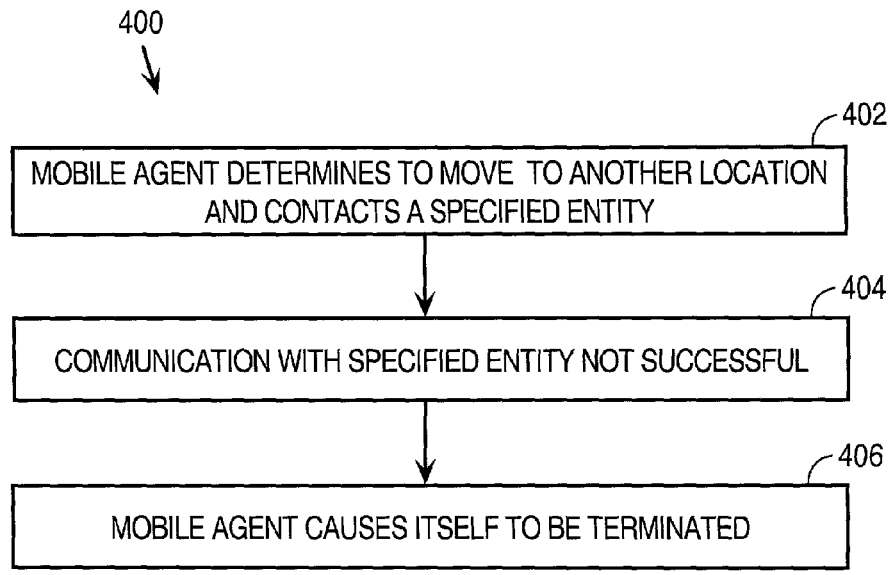
FIG. 4 is a flow diagram that depicts an approach for a mobile agent to cause itself to be terminated based upon an inability to communicate with another entity prior to moving to another location.

FIG. 4 is a flow diagram 400 that depicts an approach for a mobile agent to cause itself to be terminated based upon an inability to communicate with another entity prior to moving itself to another location. In step 402, a mobile agent determines that it will move to another location and contacts a specified entity. In the present example, mobile agent 116, residing on network element 106, determines that it will move to network element 108. Mobile agent 116 attempts to contact and inform management process 114 of the move.

In step 404, the mobile agent determines that the attempted communication was not successful, either because of a detected error or because an expected response was not received. In the present example, a failure 300 of links 110 prevents mobile agent 116 from communicating with management process 114.

In step 406, the mobile agent causes itself to be terminated in response to the unsuccessful communication. In the present example, mobile agent 116 causes itself to be terminated by causing the execution of one or more instructions in termination code 208. The execution of termination code 208 may cause the deletion of the mobile agent code 200 for mobile agent 116. Alternatively, the execution of termination code 208 may cause a termination request to be sent to network element 106, or an associated entity or process.

According to another embodiment, the specified criteria include whether a mobile agent is able to successfully communicate with a specified entity within a specified period of time. Hence, if the mobile agent does not communicate with a specified entity within a specified period of time, then the mobile agent causes itself to be terminated. In this situation, a communication may include any type of communication and the invention is not limited to any particular type of communication. For example, a communication may include a request for information or a message conveying information, such as a status message.

FIG. 5 is a flow diagram 500 that depicts an approach for a mobile agent to cause itself to be terminated based upon the mobile agent not communicating with a specified entity within a specified period of time.

In step 502, a mobile agent determines whether a communication with a specified entity has occurred within a specified period of time. In the present example, mobile agent 116 determines whether a communication has occurred with management process 114 within a specified period of time. A variety of approaches may be used to determine whether a communication has occurred within a specified period of time. For example, a log may be used to track communications between a mobile agent and other entities. The log may contain details about communications made between a mobile agent and other entities. The log is then checked once per specified period of time to determine whether a communication has been made.

As another example, a communications bit may be set whenever a successful communication occurs between the mobile agent and other entities. The communications bit may then be checked each specified period of time to determine whether a communication has occurred during the specified period of time. If so, then the communications bit is cleared. A timer mechanism may be used with either approach to establish each specified period of time.

In step 504, if a communication with a specified entity has not occurred during a specified period of time, then the mobile agent causes itself to be terminated as previously described herein.

According to another embodiment, the specified criteria include whether a mobile agent's code has been modified. If so, then the mobile agent causes itself to be terminated. For example, suppose that the mobile agent code 200 for mobile agent 116 is modified. Upon detecting that its mobile agent code 200 has been modified, for example using a checksum or signature value, mobile agent 116 causes itself to be terminated.

V. Mobile Agent Termination by Management Processes

In some situations, it may be beneficial for other entities, such as management processes, to cause the termination of mobile agents. For example, a management process may become aware that a particular mobile agent is behaving in a non-deterministic manner. Instead of relying upon the particular mobile agent to terminate itself, as described herein, the management process may cause the termination of the particular mobile agent to provide termination redundancy.

As another example, suppose that a particular mobile agent is properly configured to cause itself to be terminated based upon the occurrence of specified termination criteria. Suppose further that once the particular mobile agent is deployed into a network, it is not possible to change the specified termination criteria used by the particular mobile agent, as described herein. In this situation, a management process may be aware of other termination criteria that are satisfied and that are not known to the particular mobile agent. For example, the management process may determine that certain network loading thresholds have been exceeded and it is therefore desirable to terminate the particular mobile agent to reduce network loading.

According to one embodiment, management processes are configured to determine whether a mobile agent has moved from one network element to another network element in a network without the management process receiving a communication relating to the move. In this situation, the management process determines that the mobile agent is to be terminated. The communication may be received prior to or after the move, depending upon the requirements of a particular application. In addition, the communication may be in the form of a request to perform the move, or instead, simply a notification of the move.

According to one embodiment, management processes are configured to determine whether a communication has been received from mobile agents within a specified period of time, or at a specified time, and if not, to cause the termination of the mobile agents. Management processes may be assigned to monitor particular mobile agents that are configured to communicate periodically or at specified times with the management processes. For example, management process 114 may be configured to monitor communications from mobile agent 116. Mobile agent 116 is configured to communicate periodically or at specified times with management process 114. The communication made by mobile agent 116 may be any type of communication, depending upon the requirements of a particular application. For example, mobile agent 116 may periodically send a status message to management process 114.

The termination of mobile agents by specified processes may be performed in a variety of ways. According to one embodiment, management processes are configured to request that other entities terminate mobile agents. FIG. 6 is a flow diagram 600 that depicts a management process requesting that another entity or process terminate a mobile agent. In step 602, a particular management process determines that a particular mobile agent is to be terminated. For example, suppose that management process 114 determines that mobile agent 116, disposed on network element 106, is to be terminated based upon the satisfaction of one or more termination criteria.

In step 604, the particular management process requests that another entity or process terminate the particular mobile agent. In the present example, management process 114 contacts network element 106, or another mechanism or process responsible for managing processes on network element 106, and requests that mobile agent 116 be terminated. An example of such an entity or process is a management process or operating system.

In step 606, the other entity or process terminates the particular mobile agent. In the present example, the mechanism or process responsible for managing processes on network element 106 causes the termination of mobile agent 116.

According to another embodiment, management processes are configured to cause the termination of mobile agents using "hunter-killer" mobile agents. Hunter-killer mobile agents are mobile agents that are configured to locate and cause the termination of other mobile agents. Thus, when a particular process determines that a particular mobile agent is to be terminated, the particular processes causes a hunter-killer mobile agent to be created and deployed to locate and cause the termination of the particular mobile agent.

FIG. 7A is a block diagram that depicts this approach. A mobile agent 700 has been created and deployed onto network arrangement 100 and is currently operating on network element 108. Management process 114 determines that mobile agent 700 is to be terminated, for example because one or more termination criteria have been satisfied. Management process 114 determines further that a hunter-killer mobile agent will be used to terminate mobile agent 700. To accomplish this, management process 114 requests that mobile agent development application 112 create and deploy a mobile agent having specified attributes. FIG. 7B is a block diagram that depicts the new mobile agent 702 created and deployed onto network element 106 by mobile agent development application 112.

The particular attributes selected for mobile agent 702 may vary depending upon the requirements of a particular application. According to one embodiment, the attributes for mobile agent 702 specify the same itinerary of mobile agent 700 so that mobile agent 702 will traverse the same path through network arrangement 100. Furthermore, the attributes for mobile agent 702 may be selected to increase the speed at which mobile agent 702 moves through network arrangement 100 to allow mobile agent 702 to catch up to mobile agent 700.

Increasing the speed at which mobile agent 702 moves through network arrangement 100 may be accomplished in several ways and the invention is not limited to any particular approach. For example, the attributes for mobile agent 702 may be selected so that mobile agent 702 performs relatively less work than mobile agent 700. As another example, the attributes for mobile agent 702 may be selected so that mobile agent 702 performs less frequent communications with other entities, such as management process 114. Performing less work or less frequent communications with other entities allows mobile agent 702 to move to the next location specified by its itinerary relatively quicker than mobile agent 700.

The attributes for mobile agent 702 further specify that mobile agent 702 is to cause the termination of mobile agent 700. Termination of mobile agent 700 by mobile agent 702 may be accomplished in several ways and the invention is not limited to any particular approach. For example, mobile agent 702 may contact the network entity on which mobile agent 700 is disposed or an associated mechanism or process that has the capability and authority to cause the termination of mobile agent 700.

FIG. 8 is a flow diagram 800 that depicts an approach for causing the termination of a mobile agent using a "hunter-killer" mobile agent, according to an embodiment. In step 802, a management process determines that a particular mobile agent, the "target" mobile agent, is to be terminated. In the present example, management process 114 determines that mobile agent 700 is to be terminated.

In step 804, the management process requests that a "hunter-killer" mobile agent be generated and deployed to cause the termination of the target mobile agent. In the present example, management process 114 requests that mobile agent development application 112 create and deploy mobile agent 702. Mobile agent 702 is configured to locate and cause the termination of mobile agent 700.

In step 806, the "hunter-killer" mobile agent locates and causes the termination of the target mobile agent. In the present example, mobile agent 702 locates and causes the termination of mobile agent 700, for example by requesting a management process associated with network element 108 to terminate mobile agent 700.

The aforementioned approaches for management processes causing the termination of mobile agents may be implemented in conjunction with the aforementioned approaches for mobile agents causing the termination of mobile agents. Thus, the different approaches are not mutually exclusive. Furthermore, the termination of mobile agents by management processes as described herein may be implemented by any type of entity, including computer hardware mechanisms and computer software, and the invention is not limited to management processes.

VI. Implementation Mechanisms

Figure 9:
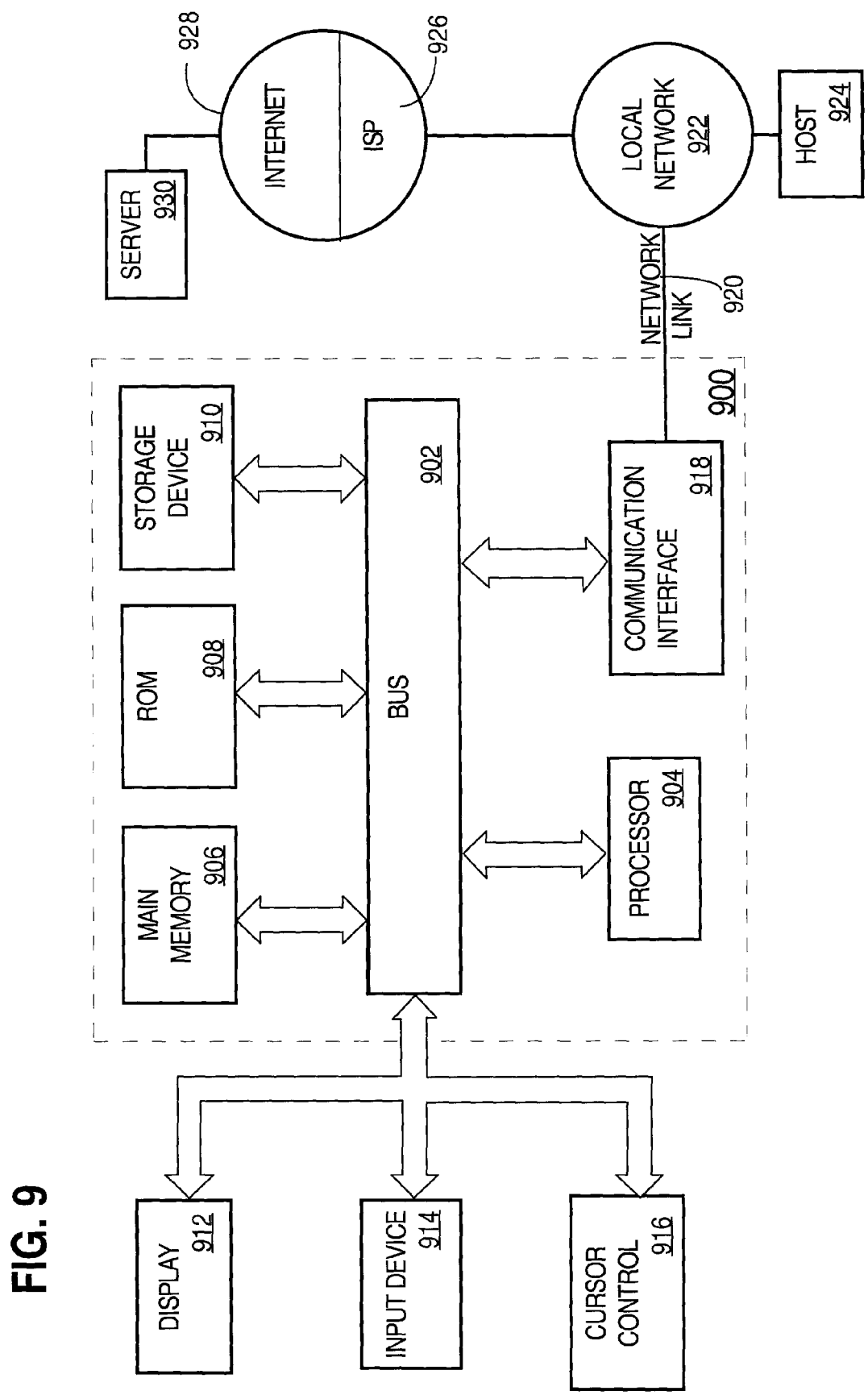
FIG. 9 is a block diagram that depicts an example computer system on which embodiments may be implemented.

FIG. 9 is a block diagram that illustrates a computer system 900 upon which an embodiment may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for managing mobile agents in networks. According to one embodiment, the management of mobile agents in networks is provided by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. One or more processors in a multi-processing arrangement may also be employed to execute the sequences of instructions contained in main memory 906. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infrared transmitter to convert the data to an infrared signal. An infrared detector coupled to bus 902 can receive the data carried in the infrared signal and place the data on bus 902. Bus 902 carries the data to main memory 906, from which processor 904 retrieves and executes the instructions.

The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the worldwide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. In accordance with the invention, one such downloaded application provides for managing mobile agents in networks as described herein.

The received code may be executed by processor 904 as it is received, and/or stored in storage device 910, or other non-volatile storage for later execution. In this manner, computer system 900 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method for managing a mobile agent in a network, wherein the mobile agent is configured with at least a capability to cause itself to move between nodes in the network, the computer-implemented method comprising:
   detecting that the mobile agent has moved from a first network element in the network to a second network element in the network;
   in response to detecting that the mobile agent has moved from the first network element in the network to the second network element in the network, determining whether a network management process received a request issued by the mobile agent to perform the move from the first network element in the network to the second network element in the network;

in response to determining that the network management process received the request issued by the mobile agent to perform the move from the first network element in the network to the second network element in the network, determining whether the mobile agent moved from the first network element in the network to the second network element in the network prior to the network management process receiving from the mobile agent the request issued by the mobile agent to perform the move from the first network element in the network to the second network element in the network; and in response to determining that the mobile agent moved from the first network element in the network to the second network element in the network prior to the network management process receiving from the mobile agent a request issued by the mobile agent to perform the move from the first network element in the network to the second network element in the network, the network management process causing the mobile agent to be terminated.

2. The computer-implemented method as recited in claim 1, wherein the mobile agent is further configured with a capability to cause itself to be terminated.

3. The computer-implemented method as recited in claim 1, wherein the network management process causing the mobile agent to be terminated includes the management process itself causing the mobile agent to be terminated.

4. The computer-implemented method as recited in claim 1, wherein:
the mobile agent is a first mobile agent, and
the network management process causing the mobile agent to be terminated includes the network management process causing a second mobile agent to be created and deployed on the network, wherein the second mobile agent is configured with a capability to at least cause itself to move between nodes in the network and to locate and cause the termination of the first mobile agent.

5. A non-transitory computer-readable medium for managing a mobile agent in a network, wherein the mobile agent is configured with at least a capability to cause itself to move between nodes in the network, the computer-readable medium storing instructions which, when processed by one or more processors, causes:
detecting that the mobile agent has moved from a first network element in the network to a second network element in the network;
in response to detecting that the mobile agent has moved from the first network element in the network to the second network element in the network, determining whether a network management process received a request issued by the mobile agent to perform the move from the first network element in the network to the second network element in the network;
in response to determining that the network management process received the request issued by the mobile agent to perform the move from the first network element in the network to the second network element in the network, determining whether the mobile agent moved from the first network element in the network to the second network element in the network prior to the network management process receiving from the mobile agent the request issued by the mobile agent to perform the move from the first network element in the network to the second network element in the network; and in response to determining that the mobile agent moved from the first network element in the network to the second network element in the network prior to the network management process receiving from the mobile agent a request issued by the mobile agent to perform the move from the first network element in the network to the second network element in the network, the network management process causing the mobile agent to be terminated.

6. The non-transitory computer-readable medium as recited in claim 5, wherein the mobile agent is further configured with a capability to cause itself to be terminated.

7. The non-transitory computer-readable medium as recited in claim 5, wherein the network management process causing the mobile agent to be terminated includes the management process itself causing the mobile agent to be terminated.

8. The non-transitory computer-readable medium as recited in claim 5, wherein:
the mobile agent is a first mobile agent, and
the network management process causing the mobile agent to be terminated includes the network management process causing a second mobile agent to be created and deployed on the network, wherein the second mobile agent is configured with a capability to at least cause itself to move between nodes in the network and to locate and cause the termination of the first mobile agent.

9. An apparatus for managing a mobile agent in a network, wherein the mobile agent is configured with at least a capability to cause itself to move between nodes in the network, the apparatus comprising:
one or more processors; and
a memory storing instructions which, when processed by the one or more processors, causes: detecting that the mobile agent has moved from a first network element in the network to a second network element in the network;
in response to detecting that the mobile agent has moved from the first network element in the network to the second network element in the network, determine whether a network management process received a request issued by the mobile agent to perform the move from the first network element in the network to the second network element in the network;
in response to determining that the network management process received the request issued by the mobile agent to perform the move from the first network element in the network to the second network element in the network, determine whether the mobile agent moved from the first network element in the network to the second network element in the network prior to the network management process receiving from the mobile agent the request issued by the mobile agent to perform the move from the first network element in the network to the second network element in the network; and
in response to determining that the mobile agent moved from the first network element in the network to the second network element in the network prior to the network management process receiving from the mobile agent a request issued by the mobile agent to perform the move from the first network element in the network to the second network element in the network, causing the network management process to cause the mobile agent to be terminated.

10. The apparatus as recited in claim 9, wherein the mobile agent is further configured with a capability to cause itself to be terminated.

11. The apparatus as recited in claim 9, wherein the memory stores additional instructions which, when processed by the one or more processors, causes the mobile agent to be terminated by requesting that a management process cause the mobile agent to be terminated.

12. The apparatus as recited in claim 9, wherein:
the mobile agent is a first mobile agent, and
the apparatus is further configured to cause a second mobile agent to be created and deployed on the network, wherein the second mobile agent is configured with a capability to at least cause itself to move between nodes in the network and to locate and cause the termination of the first mobile agent.

* * * * *